US012794094B2

(12) United States Patent
Park

(10) Patent No.: US 12,794,094 B2
(45) Date of Patent: Nov. 10, 2026

(54) ELECTROLYTE INJECTION DEVICE AND ELECTROLYTE INJECTION METHOD

(71) Applicant: SAMSUNG SDI CO., LTD., Yongin-si (KR)

(72) Inventor: Seongjoo Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 35 days.

(21) Appl. No.: 19/085,936

(22) Filed: Mar. 20, 2025

(65) Prior Publication Data

US 2026/0005416 A1 Jan. 1, 2026

(30) Foreign Application Priority Data

Jun. 26, 2024 (KR) ........................ 10-2024-0083881

(51) Int. Cl.

*H01M 2/36* (2006.01)
*H01M 50/609* (2021.01)
*H01M 50/655* (2021.01)

(52) U.S. Cl.

CPC ........ *H01M 50/609* (2021.01); *H01M 50/655* (2021.01); *Y02E 60/10* (2013.01)

(58) Field of Classification Search

CPC .... H01M 50/609; H01M 50/655; Y02E 60/10
See application file for complete search history.

(56) References Cited

U.S. PATENT DOCUMENTS 3,534,785 A * 10/1970 Bensen ............... H01M 50/673 222/209
5,731,099 A * 3/1998 Badger ............... H01M 50/673 137/260
6,248,138 B1 * 6/2001 Lafave ................ H01M 50/627 29/623.1
6,588,461 B2 * 7/2003 Morizane ............ H01M 50/673 429/81

(Continued)

FOREIGN PATENT DOCUMENTS

CN 116780128 A 9/2023
EP 3442052 A1 2/2019

(Continued)

OTHER PUBLICATIONS

Extended European Search Report dated Dec. 1, 2025, of the corresponding European Patent Application No. 25178047.4 (9 pages).

*Primary Examiner* — Nicolas A Arnett
(74) *Attorney, Agent, or Firm* — Womble Bond Dickinson (US) LLP

(57) ABSTRACT

An electrolyte injection device includes: an electrolyte injection pipe that is configured to be coupled to an injection hole of a case; an exhaust module including a vacuum pump that is connected to the electrolyte injection pipe and is configured to exhaust an internal space of the case, and an air sensor configured to measure an amount of an exhaust air of the case; an electrolyte injection module including an electrolyte tank that is connected to the electrolyte injection pipe and is configured to store an electrolyte, and an injection (Continued)

nozzle installed at an inlet of the electrolyte tank; and a control portion that is electrically connected to each of the air sensor and the injection nozzle.

17 Claims, 9 Drawing Sheets

(56) References Cited

U.S. PATENT DOCUMENTS

| | | | | |
|---|---|---|---|---|
| 9,680,146 | B2 * | 6/2017 | Wipperfuerth | H01M 50/609 |
| 12,326,390 | B2 * | 6/2025 | Yan | H01M 10/0569 |
| 2019/0355960 | A1 * | 11/2019 | Hong | H01M 50/119 |
| 2023/0299446 | A1 * | 9/2023 | Ozaki | H01M 50/627 29/623.1 |

FOREIGN PATENT DOCUMENTS

| | | | | |
|---|---|---|---|---|
| JP | 2009-123482 A | | 6/2009 | |
| JP | 2017157280 A | * | 9/2017 | H01M 2/10 |
| KR | 10-2015-0049598 A | | 5/2015 | |
| KR | 10-2045478 B1 | | 11/2019 | |

* cited by examiner

1001

ELECTROLYTE INJECTION DEVICE AND ELECTROLYTE INJECTION METHOD

CROSS-REFERENCE TO RELATED APPLICATION

The present application claims priority to and the benefit of Korean Patent Application No. 10-2024-0083881, filed on Jun. 26, 2024, in the Korean Intellectual Property Office, the entire disclosure of which is incorporated herein by reference.

BACKGROUND

1. Field

One or more aspects of embodiments of the present disclosure are directed to an electrolyte injection device and an electrolyte injection method, and for example, to a device and a method for injecting an appropriate or suitable amount of an electrolyte into a case of a rechargeable battery.

2. Description of the Related Art

A rechargeable battery includes an electrode assembly including a positive electrode, a negative electrode, and a separator, and a case that accommodates and seals the electrode assembly and an electrolyte in an internal space thereof. A lithium-ion rechargeable battery may use the electrolyte that is in a liquid state. The electrolyte is a material that enables or facilitates movement of lithium ions between the positive electrode and the negative electrode, stabilizes a surface of the negative electrode, and improves lifespan and charging and discharging characteristics of the rechargeable battery.

An injection hole for injection of the electrolyte may be provided at (or in) the case. In a manufacturing process of the rechargeable battery, an electrolyte injection device injects a set or predetermined amount of the electrolyte into the case through the injection hole, and seals the injection hole with a plug (or a stopper) after the electrolyte is injected. Although an injection amount of the electrolyte is collectively determined (e.g., is set), a volume of a space inside the case capable of accommodating the electrolyte may vary for each rechargeable battery depending on a kind of manufacturing process that is utilized.

If the injection amount of the electrolyte is unsuitably small compared with the volume of the space inside the case, lifespan of the rechargeable battery may be shortened. Conversely, if the injection amount of the electrolyte is unsuitably large compared with the volume of the space inside the case, the electrolyte may overflow so that the case becomes contaminated with the electrolyte. The rechargeable battery in which the case is contaminated by the electrolyte may be discarded, thus increasing manufacturing costs.

SUMMARY

One or more aspects of embodiments of the present disclosure are directed toward providing an electrolyte injection device and an electrolyte injection method capable of improving performance and lifespan of a rechargeable battery by injecting a maximum amount (e.g., a maximum suitable or desirable amount) of an electrolyte without a lack of the electrolyte or an overflow of the electrolyte in each rechargeable battery.

An electrolyte injection device according to one or more embodiments includes: an electrolyte injection pipe that is configured to be coupled to an injection hole of a case; an exhaust module including a vacuum pump that is connected to the electrolyte injection pipe and configured to exhaust an internal space of the case, and an air sensor configured to measure an amount of an exhaust air of the case; an electrolyte injection module including an electrolyte tank connected to the electrolyte injection pipe and configured to store an electrolyte and, and an injection nozzle installed at an inlet of the electrolyte tank; and a control portion that is electrically connected to each of the air sensor and the injection nozzle.

The electrolyte injection pipe may include a first pipe portion and a second pipe portion extending in different directions from each other. The exhaust module may be connected to and installed at one of the first pipe portion or the second pipe portion, and the electrolyte injection module may be connected to and installed at the other of the first pipe portion or the second pipe portion. The electrolyte injection pipe may further include a main pipe portion coupled to the injection hole, and the first pipe portion and the second pipe portion may be branched from the main pipe portion.

The control portion may control an injection amount of the electrolyte from the injection nozzle based on an amount of the exhaust air measured by the air sensor. The control portion may calculate an injection amount of the electrolyte corresponding to the amount of the exhaust air measured by the air sensor, and may control an operation of the injection nozzle so that an amount of the electrolyte equal to the calculated injection amount of the electrolyte is injected into the case.

An electrolyte injection device according to other embodiments includes: an electrolyte injection pipe that includes a plurality of branch pipes respectively coupled to injection holes of a plurality of cases; a plurality of opening and closing valves that are respectively installed at the plurality of branch pipes; an exhaust module including a vacuum pump that is connected to the electrolyte injection pipe and configured to exhaust an internal space of each of the plurality of cases, and an air sensor configured to measure an amount of an exhaust air of each of the plurality of cases; an electrolyte injection module including an electrolyte tank that is connected to the electrolyte injection pipe and configured to store an electrolyte, and an injection nozzle installed at an inlet of the electrolyte tank; and a control portion that is electrically connected to each of the plurality of opening and closing valves, the air sensor, and the injection nozzle.

The electrolyte injection pipe may include a main pipe portion connected to the plurality of branch pipes and a first pipe portion and a second pipe portion branched from the main pipe portion. The exhaust module may be connected to and installed at one of the first pipe portion or the second pipe portion, and the electrolyte injection module may be connected to and installed at the other of the first pipe portion or the second pipe portion.

The control portion may sequentially open the plurality of opening and closing valves so that the electrolyte is sequentially injected into the plurality of cases with a time difference. The control portion may control an injection amount of the electrolyte from the injection nozzle for each of the plurality of cases based on an amount of the exhaust air measured by the air sensor. The control portion may calculate an injection amount of the electrolyte corresponding to the amount of the exhaust air measured by the air sensor, and may control an operation of the injection nozzle so that an amount of the electrolyte equal to the calculated injection amount of the electrolyte is injected into the case.

An electrolyte injection method according to one or more embodiments includes: coupling an electrolyte injection pipe to an injection hole of a case; exhausting an internal space of the case by an operation of a vacuum pump and concurrently (e.g., simultaneously) measuring an amount of an exhaust air of the case by using an air sensor; calculating an injection amount of an electrolyte based on the amount of the exhaust air measured by the air sensor; and injecting an amount of the electrolyte equal to the calculated injection amount of the electrolyte into the case by opening an injection nozzle provided at an inlet of an electrolyte tank.

The electrolyte injection pipe may be coupled to the injection hole through a sealing member. The injection amount of the electrolyte may be calculated to be a value that is equal to the amount of the exhaust air measured by the air sensor or to a corrected amount of the exhaust air based on a density of the electrolyte.

The electrolyte injection pipe may include a plurality of branch pipes respectively coupled to injection holes of a plurality of cases, an opening and closing valve may be installed at each of the plurality of branch pipes, and a plurality of opening and closing valves may be sequentially opened so that the electrolyte is sequentially injected into the plurality of cases with a time difference.

The injection amount of the electrolyte for each of the plurality of cases may be calculated to be a value that is equal to the amount of the exhaust air measured by the air sensor or to a corrected amount of the exhaust air based on a density of the electrolyte.

According to the embodiments, a maximum amount (e.g., a maximum suitable or desirable amount) of an electrolyte may be supplied to each of a plurality of cases having different internal space volumes (e.g., slight differences in internal space volumes) due to a process deviation (e.g., due to deviations inherent in a manufacturing process). Thus, if the electrolyte is injected, the electrolyte injection device according to the present embodiments may prevent or reduce an electrolyte lack phenomenon and/or an electrolyte overflow phenomenon, and may improve performance and lifespan of a rechargeable battery.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
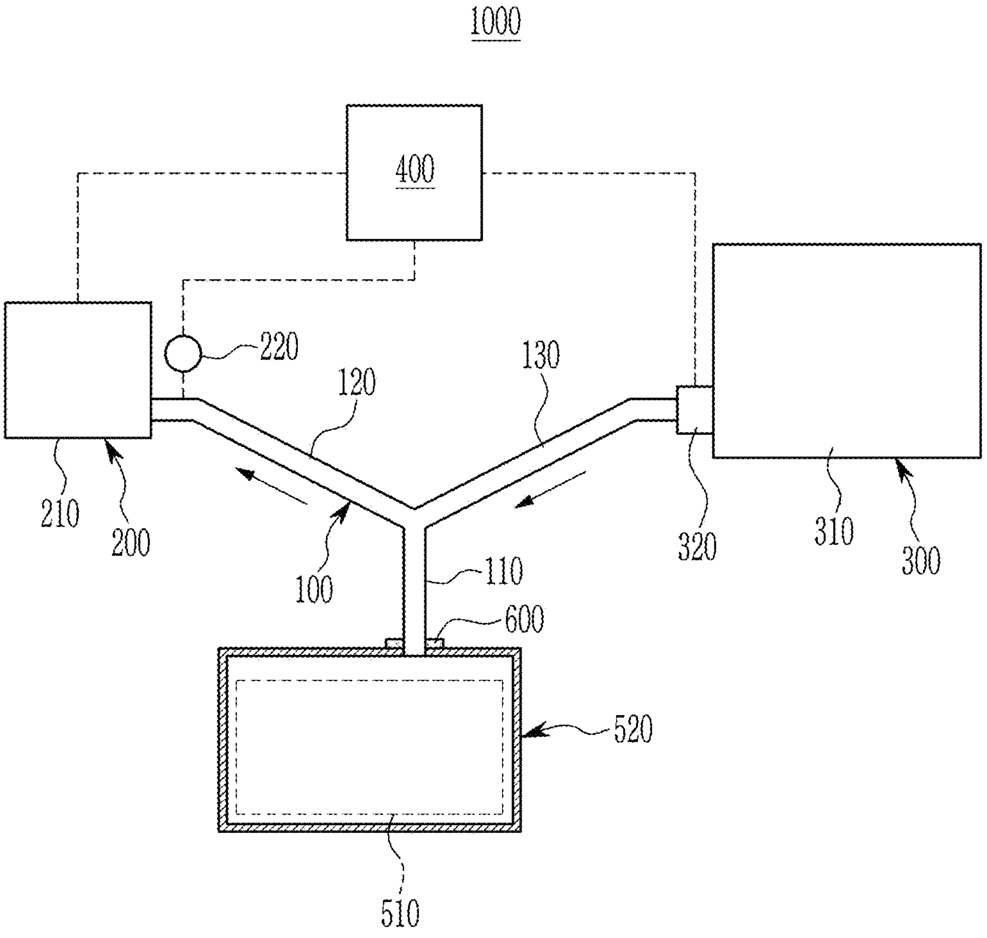
FIG. 1 is a configuration diagram of an electrolyte injection device according to one or more embodiments.

Embodiments of the present disclosure will be described more fully hereinafter with reference to the accompanying drawings so that those skilled in the art could easily implement the embodiments. The subject matter of the present disclosure may be modified in one or more suitable ways, all without departing from the spirit or scope of the present disclosure. A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

The terminology used herein is for the purpose of describing particular example embodiments only and is not intended to limit the example embodiments described herein.

It will be understood that, although the terms first, second, etc. may be used herein to describe various elements, these elements should not be limited by these terms. These terms are only used to distinguish one element from another element. Thus, a first element could be termed a second element without departing from the teachings of the present invention. Similarly, a second element could be termed a first element.

As used herein, the singular forms "a," "an," and "the" are intended to include the plural forms as well, unless the context clearly indicates otherwise.

It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the terms "use," "using," and "used" may be considered synonymous with the terms "utilize," "utilizing," and "utilized," respectively.

As used herein, expressions such as "at least one of", "one of", and "selected from", when preceding a list of elements, modify the entire list of elements and do not modify the individual elements of the list. For example, "at least one selected from among a, b and c", "at least one of a, b or c", and "at least one of a, b and/or c" may indicate only a, only b, only c, both (e.g., simultaneously) a and b, both (e.g., simultaneously) a and c, both (e.g., simultaneously) b and c, all of a, b, and c, or variations thereof.

As used herein, the term "and/or" includes any and all combinations of one or more of the associated listed items. Further, the use of "may" when describing embodiments of the present disclosure refers to "one or more embodiments of the present disclosure".

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

Spatially relative terms, such as "beneath," "below," "lower," "above," "upper," "bottom," "top" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The electronic device and/or any other relevant devices or components according to embodiments of the present disclosure described herein (such as, for example, the control portion 400) may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

Figure 2:
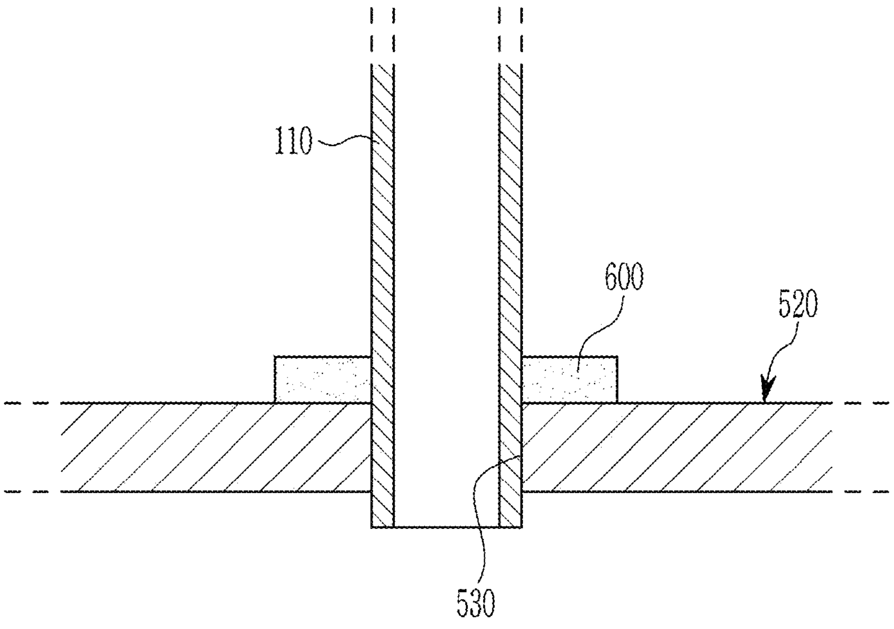
FIG. 2 is a partially enlarged view of FIG. 1.

FIG. 1 is a configuration diagram of an electrolyte injection device according to one or more embodiments, and FIG. 2 is a partially enlarged view of FIG. 1.

Referring to FIG. 1 and FIG. 2, the electrolyte injection device 1000 according to the present embodiments may include an electrolyte injection pipe 100 configured to be coupled to an injection hole 530 of a case 520, an exhaust module 200 and an electrolyte injection module 300 connected to and installed at the electrolyte injection pipe 100, and a control portion 400 electrically connected (e.g., electrically coupled) to each of the exhaust module 200 and the electrolyte injection module 300 to control (or regulate) an injection amount of an electrolyte.

Figure 3:
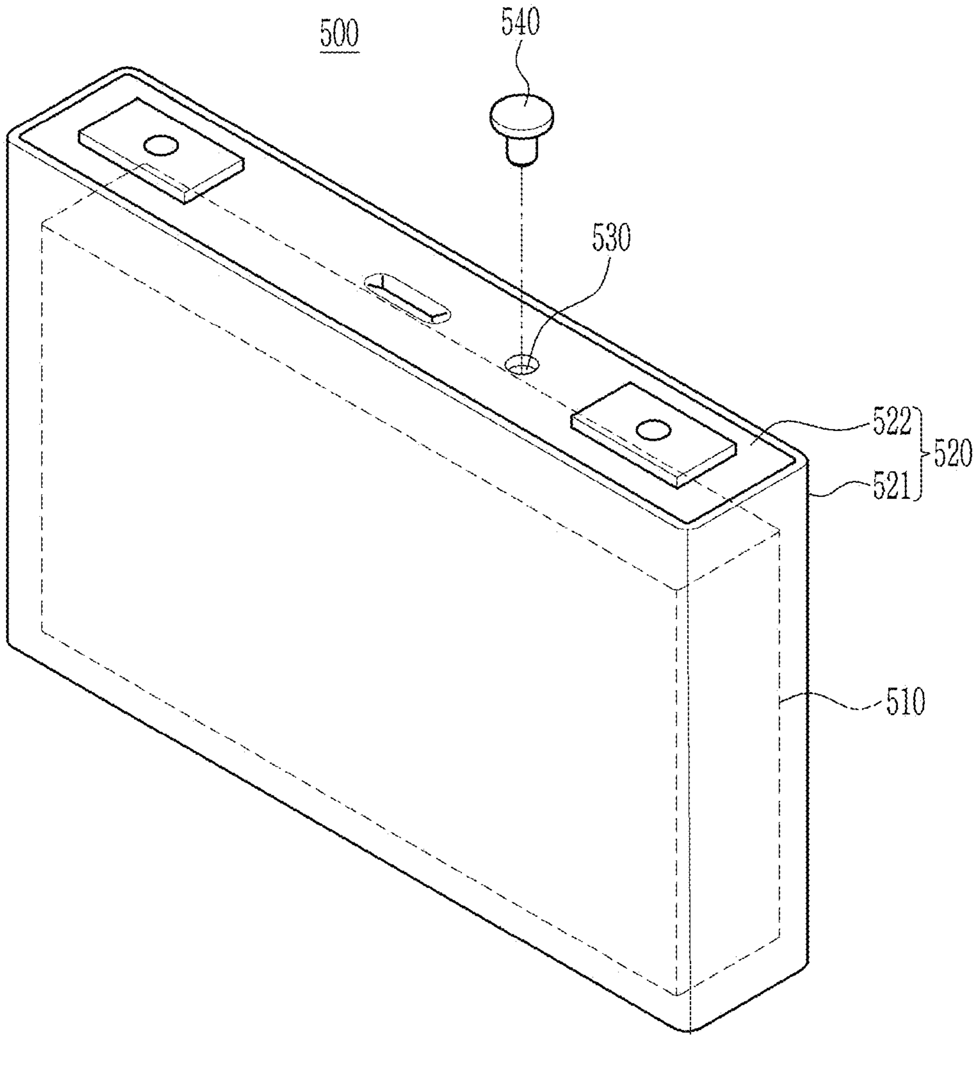
FIG. 3 is a perspective view of a prismatic rechargeable battery according to one or more embodiments.

Herein below, a rechargeable battery will be briefly described. FIG. 3 is a perspective view of a prismatic rechargeable battery, and FIG. 4 is a perspective view of a cylindrical rechargeable battery.

Figure 4:
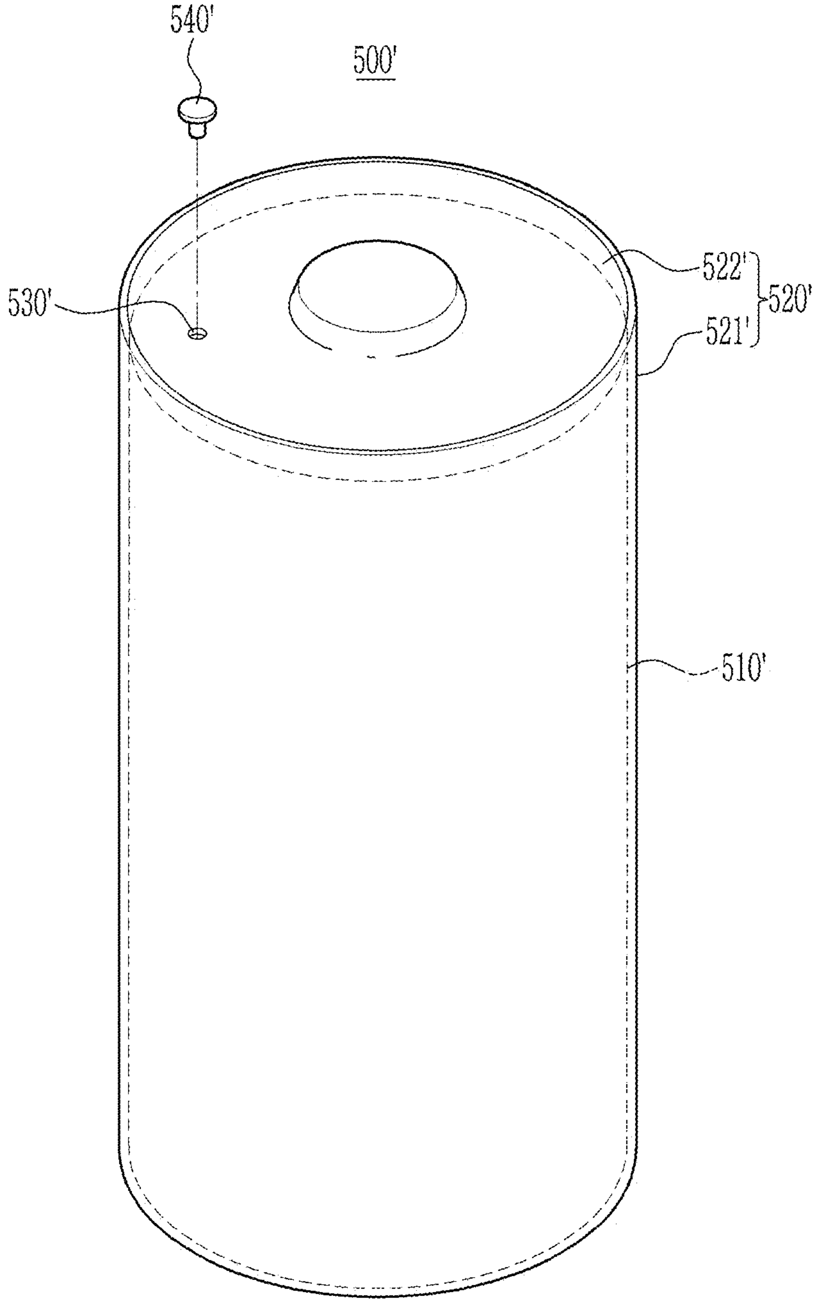
FIG. 4 is a perspective view of a cylindrical rechargeable battery according to one or more embodiments.

Referring to FIG. 3 and FIG. 4, a rechargeable battery 500 or 500' may include an electrode assembly 510 or 510' and a case 520 or 520' accommodating the electrode assembly 510 or 510' in an internal space thereof. The case 520 or 520' may include a can 521 or 521' having a shape with one side open (or having an opening), and a cap plate 522 or 522' coupled to an opening-side end portion of the can 521 or 521' to seal the can 521 or 521'.

The electrode assembly 510 or 510' may include a positive electrode, a negative electrode, and a separator. The positive electrode may include a positive active material, and the positive active material may include lithium transition metal composite oxide. The negative electrode may include a negative active material, and the negative active material may include at least one selected from among a carbon-based material and a silicon-based material.

The separator may include a porous sheet, and may insulate (e.g., electrically insulate) the positive electrode and the negative electrode from each other while allowing lithium ions to move. A type or kind of the electrode assembly 510 or 510' may include a wound type or kind and/or a stacked type or kind, but is not limited to these examples.

The electrode assembly 510 or 510' may be accommodated in an internal space of the case 520 or 520' together with the electrolyte that is in a liquid state. The electrolyte is a medium that enables or facilitates movement of the lithium ions between the positive electrode and the negative electrode. The electrode assembly 510 or 510' should be sufficiently or suitably impregnated with the electrolyte to perform a suitably stable charging and discharging function. The electrolyte may include a lithium salt, an organic solvent, and an additive.

An injection hole 530 or 530' for injection of the electrolyte may be provided at (or in) the case 520 or 520' (e.g., in the cap plate 522 or 522'). In a manufacturing process of the rechargeable battery 500 or 500', the electrode assembly 510 or 510' may be accommodated inside the can 521 or 521', and the can 521 or 521' and the cap plate 522 or 522' may be coupled to each other (e.g., integrally coupled) by a method such as welding.

Next, the electrolyte may be injected into the case 520 or 520' through the injection hole 530 or 530', and the injection hole 530 or 530' may be sealed by a plug (or a stopper) 540 or 540'. The entire (or substantially entire) internal space of the case 520 or 520' except for the electrode assembly 510 or 510' should be filled with the electrolyte. In some embodiments, a volume of the internal space of the case 520 or 520' capable of accommodating the electrolyte may vary depending on a process deviation for each rechargeable battery. For example, during the process of manufacturing (e.g., concurrently manufacturing) a plurality of rechargeable batteries, certain inherent deviations within the manufacturing process may occur, and thus certain deviations in the internal space volume of each battery may result. In some embodiments, these inherent deviations may include, for example, variations in thickness and/or shape of walls of the case 520 or 520' and/or variations in volume of the electrode assembly 510 or 510'.

If the injection amount of the electrolyte is less than the volume of the internal space of the case 520 or 520', an empty space may exist inside the case 520 or 520'. This may lead to a shortened lifespan of the rechargeable battery. If the injection amount of the electrolyte is greater than the volume of the internal space of the case 520 or 520', the electrolyte may overflow so that the cap plate 522 or 522' is contaminated with the electrolyte. The rechargeable battery with the cap plate 522 or 522' contaminated with the electrolyte may be discarded (e.g., may not be re-used).

Referring back to FIG. 1 and FIG. 2, the electrolyte injection device 1000 of the present embodiments may be used in an electrolyte injection process during the manufacturing process of the rechargeable battery, and may be configured to inject a maximum amount (e.g., a maximum suitable or desirable amount) of the electrolyte in each case 520 (e.g., in each case 520 manufactured during the process of manufacturing a plurality of rechargeable batteries). For example, the electrolyte injection device 1000 of the present embodiments is configured to inject the maximum amount (e.g., a maximum suitable or desirable amount) of the electrolyte for each of a plurality of cases 520 having different internal space volumes due to the process deviation (e.g., due to certain inherent deviations within the manufacturing process).

The electrolyte injection pipe 100 may be coupled to the injection hole 530 of the case 520. In some embodiments, a sealing member 600 such as an O-ring may be arranged around a lower end portion of the electrolyte injection pipe 100 fitted and/or inserted into the injection hole 530. The sealing member 600 may prevent or reduce the leakage of air and/or the electrolyte by preventing or reducing a gap between the electrolyte injection pipe 100 and the injection hole 530.

The electrolyte injection pipe 100 may include a first pipe portion 120 and a second pipe portion 130 branched to have different paths (e.g., to extend in different directions). For example, the electrolyte injection pipe 100 may include a main pipe portion 110 coupled to the injection hole 530, and the first pipe portion 120 and the second pipe portion 130 branched out from an upper end portion of the main pipe portion 110 into two separate pipe portions. The main pipe portion 110 may extend substantially along a vertical direction as shown in the drawings, and a lower end portion of the main pipe portion 110 may be fitted and/or inserted into the injection hole 530 of the case 520 via the sealing member 600.

The first pipe portion 120 and the second pipe portion 130 may form a V-shape, with the first pipe portion 120 and the second pipe portion 130 bent at substantially the same angle (but in opposite directions) from the main pipe portion 110, but the present disclosure is not limited to the example. Inner diameters of the main pipe portion 110, the first pipe portion 120, and the second pipe portion 130 may be the same or different. For example, the first pipe portion 120 and the second pipe portion 130 may have the same inner diameter, and the inner diameter of the main pipe portion 110 may be larger than the inner diameter of each of the first pipe portion 120 and the second pipe portion 130. As used herein, "inner diameter" may refer to a diameter of a hollow space inside the first pipe portion 120, the second pipe portion 130, and the main pipe portion 110.

The exhaust module 200 may be connected to and installed at the first pipe portion 120. The exhaust module 200 may include a vacuum pump 210 that exhausts (e.g., discharges air from) the internal space of the case 520 and an air sensor 220 that measures an amount of air exhausted or discharged from the case 520 if (e.g., when) the vacuum pump 210 is operated. The vacuum pump 210 may discharge air inside the case 520 so that the internal space of the case 520 has a pressure of approximately −80 kPa to −95 kPa.

The air sensor 220 may be linked to the vacuum pump 210 to be automatically operated if (e.g., when) the vacuum pump 210 is operated, and may accurately measure a small amount of exhaust air (e.g., expel or discharge air). The air sensor 220 may include an air flow sensor and/or an air flow meter, and one or more suitable types (kinds) of air flow sensors and/or air flow meters may be used as the air sensor 220.

The electrolyte injection module 300 may be connected to and installed at the second pipe portion 130. The electrolyte injection module 300 may include an electrolyte tank 310 storing the electrolyte and an injection nozzle 320 installed at an inlet of the electrolyte tank 310.

The electrolyte tank 310 may store an amount of the electrolyte capable of being injected into the plurality of cases. The injection nozzle 320 may temporarily open the inlet of the electrolyte tank 310 to discharge some of the electrolyte stored in the electrolyte tank 310 into the case 520. The injection nozzle 320 may include a quantitative liquid discharge nozzle that discharges a set or specified amount of the electrolyte.

The control portion 400 may be electrically connected to the vacuum pump 210, the air sensor 220, and the injection nozzle 320 to control or regulate operations of the vacuum pump 210, the air sensor 220, and the injection nozzle 320. For example, the control portion 400 may control or regulate an injection amount of the electrolyte of the injection nozzle 320 based on an amount of exhaust air measured by the air sensor 220. The control portion 400 may include a general or suitable computer program, and may be operated by a set or predetermined logic or algorithm.

The control portion 400 may receive information on the amount of exhaust air measured by the air sensor 220 (from the air sensor 220), and may calculate an injection amount of the electrolyte corresponding to the amount of exhaust air. The injection amount of the electrolyte calculated by the control portion 400 may be a maximum injection amount (e.g., a maximum suitable or desirable injection amount) capable of filling the entire internal space of the case 520 without an overflow of the electrolyte.

The information on the amount of exhaust air measured by the air sensor 220 may be information on a volume unit. The control portion 400 may calculate the injection amount of the electrolyte by converting and correcting the information on the volume unit (e.g., in units of volume) received from the air sensor 220 into information on a mass unit (e.g., in units of mass) of the electrolyte.

For example, before the electrolyte injection device 1000 is operated, a maximum possible injection amount (e.g., a maximum suitable or desirable injection amount) of the electrolyte on a mass unit (e.g., in units of mass) corresponding to the information on the amount of exhaust air on the volume unit (e.g., in units of volume) may be determined by experimentation. Information on the maximum possible injection amount (e.g., a maximum suitable or desirable injection amount) corresponding to the amount of exhaust air determined by the experimentation may be stored in a memory of the control portion 400.

If the control portion 400 receives information on the amount of exhaust air from the air sensor 220, the control portion 400 may upload the information on the maximum possible injection amount (e.g., a maximum suitable or desirable injection amount) corresponding to the amount of exhaust air into the memory to calculate the information as the injection amount of the electrolyte. Because density of the electrolyte changes according to a composition thereof, the control portion 400 may correct the injection amount of the electrolyte by applying a correction value according to the density to the calculated injection amount of the electrolyte.

After the control portion 400 calculates the injection amount of the electrolyte, the control portion 400 may control or regulate the injection amount of the electrolyte of the injection nozzle 320 by controlling an opening time and/or an opening degree of the injection nozzle 320. For example, the control portion 400 may control an operation of the injection nozzle 320 so that the injection amount of the electrolyte of the injection nozzle 320 matches the calculated injection amount of the electrolyte. When the injection nozzle 320 is opened, the internal space of the case 520 may be in a low-pressure state. Thus, the electrolyte may be quickly and smoothly injected into the internal space of the case 520.

The control portion 400 may control or regulate the injection amount of the electrolyte of the injection nozzle 320 based on the amount of exhaust air measured by the air sensor 220, so that it may supply the maximum amount (e.g., a maximum suitable or desirable amount) of the electrolyte to each of the plurality of cases 520 having different internal space volumes due to the process deviation. The electrolyte injection device 1000 according to the present embodiments may suppress or reduce an electrolyte lack phenomenon and/or an electrolyte overflow phenomenon, and may improve performance and lifespan of the rechargeable battery.

Figure 5:
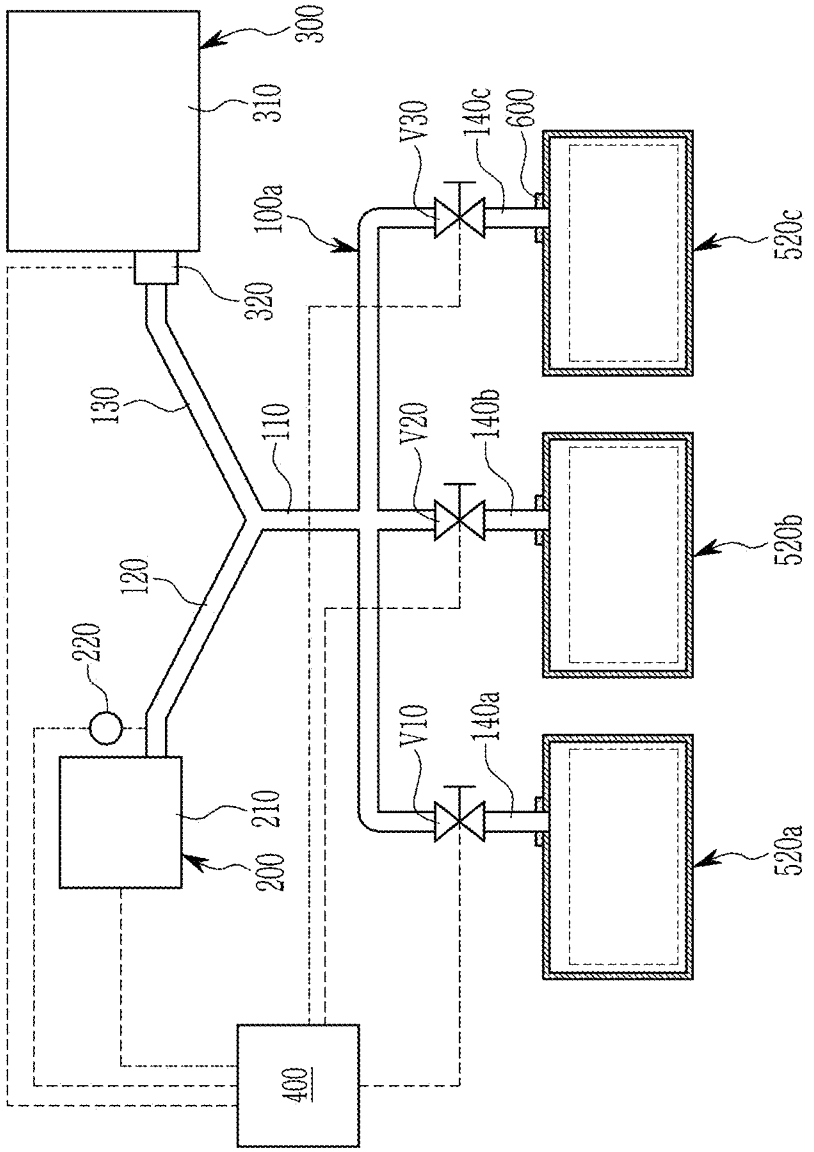
FIG. 5 is a configuration diagram of an electrolyte injection device according to one or more other embodiments.

FIG. 5 is a configuration diagram of an electrolyte injection device according to one or more other embodiments.

Referring to FIG. 5, the electrolyte injection device 1001 according to the present embodiments may be coupled to a plurality of cases 520*a*, 520*b*, and 520*c*, and may be configured to sequentially supply an electrolyte to the plurality of cases 520*a*, 520*b*, and 520*c* with a time difference.

The plurality of cases 520*a*, 520*b*, and 520*c* may be installed at or in a transfer device such as a carrier, and may be aligned side by side with a set or predetermined distance from each other. In FIG. 5, the three cases 520*a*, 520*b*, and 520*c* are illustrated as an example, but the number of cases is not limited to the illustrated example.

An electrolyte injection pipe 100*a* may include a plurality of branch pipes 140*a*, 140*b*, and 140*c* respectively coupled to injection holes of the plurality of cases 520*a*, 520*b*, and 520*c*, a main pipe portion 110 connected to the plurality of branch pipes 140*a*, 140*b*, and 140*c*, and a first pipe portion 120 and a second pipe portion 130 connected to the main pipe portion 110.

The electrolyte injection device 1001 may include a plurality of opening and closing valves V10, V20, and V30 respectively installed at the plurality of branch pipes 140*a*, 140*b*, and 140*c*. A control portion 400 may be electrically connected to the plurality of opening and closing valves V10, V20, and V30 to control or regulate opening and closing thereof.

The main pipe portion 110 may be positioned above the plurality of branch pipes 140*a*, 140*b*, and 140*c*, and the first pipe portion 120 and the second pipe portion 130 may be arranged above the main pipe portion 110. A sealing member 600 such as an O-ring may be arranged at a lower end portion of each of the plurality of branch pipes 140*a*, 140*b*, and 140*c* respectively fitted and/or inserted into the injection holes of the plurality of cases 520*a*, 520*b*, and 520*c*. The main pipe portion 110 may extend substantially along a vertical direction of the drawings, and the first pipe portion 120 and the second pipe portion 130 may be bent at substantially the same angle (but in opposite directions) from the main pipe portion 110, but the present disclosure is not limited to the example.

An exhaust module 200 may be connected to and installed at the first pipe portion 120, and may include a vacuum pump 210 and an air sensor 220. An electrolyte injection module 300 may be connected to and installed at the second pipe portion 130, and may include an electrolyte tank 310 and an injection nozzle 320. The control portion 400 may be electrically connected to the vacuum pump 210, the air sensor 220, and the injection nozzle 320 to control or regulate operations of the vacuum pump 210, the air sensor 220, and the injection nozzle 320. Configurations of the exhaust module 200 and the electrolyte injection module 300 are the same as those of the embodiments described above, so that a redundant description thereof may not be repeated herein.

Figure 6A:
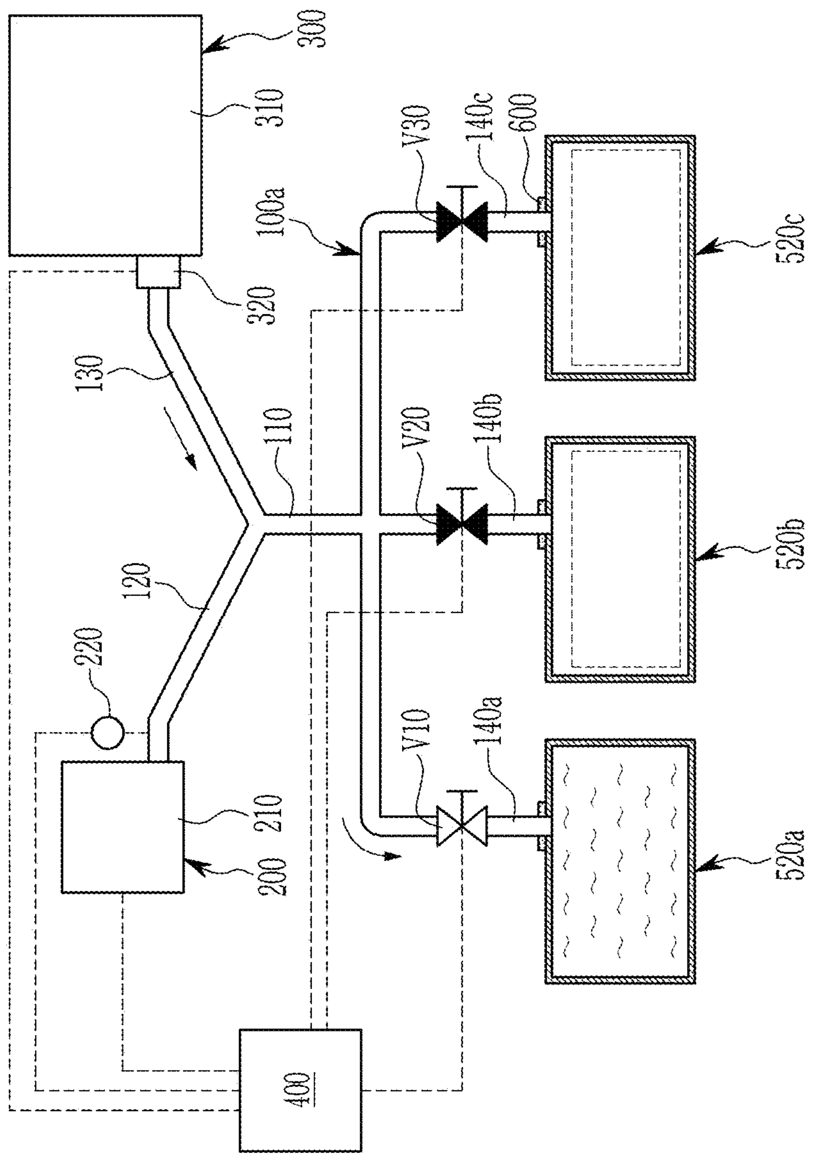
FIGS. 6A-6C are each a configuration diagram for describing an operation of the electrolyte injection device shown in FIG. 5.
Figure 6B:
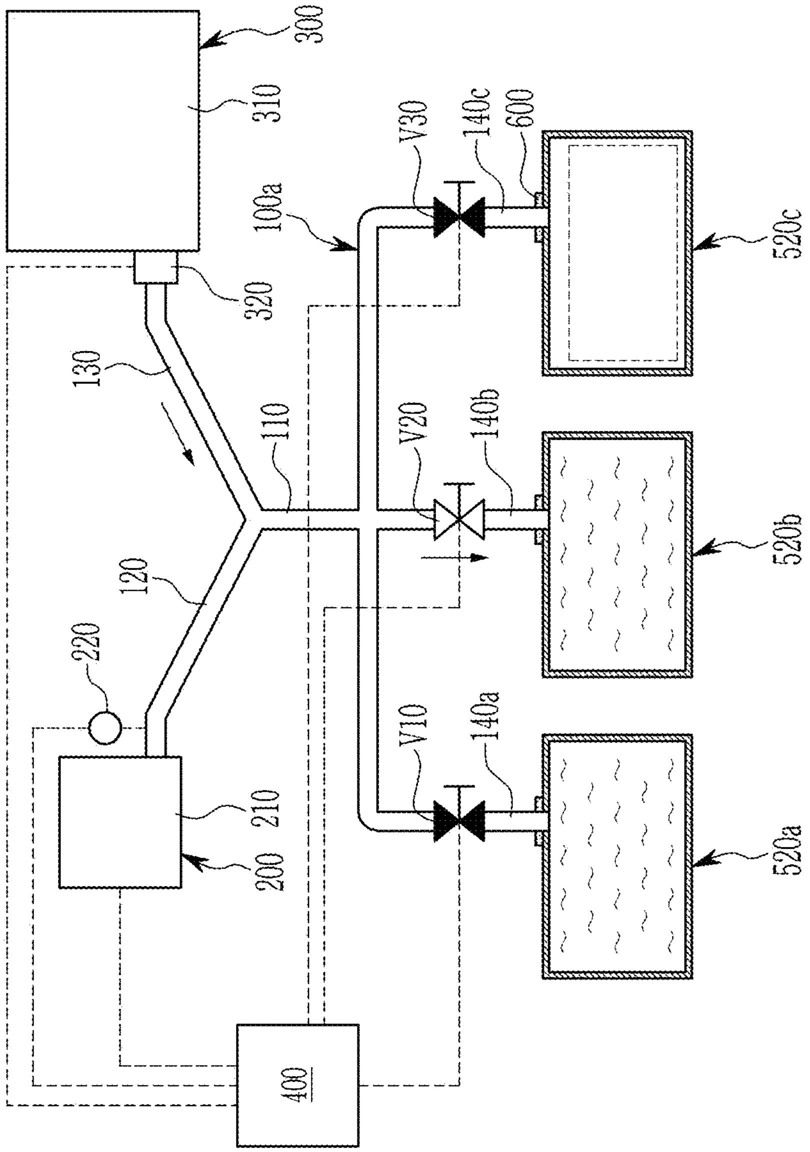
Figure 6C:
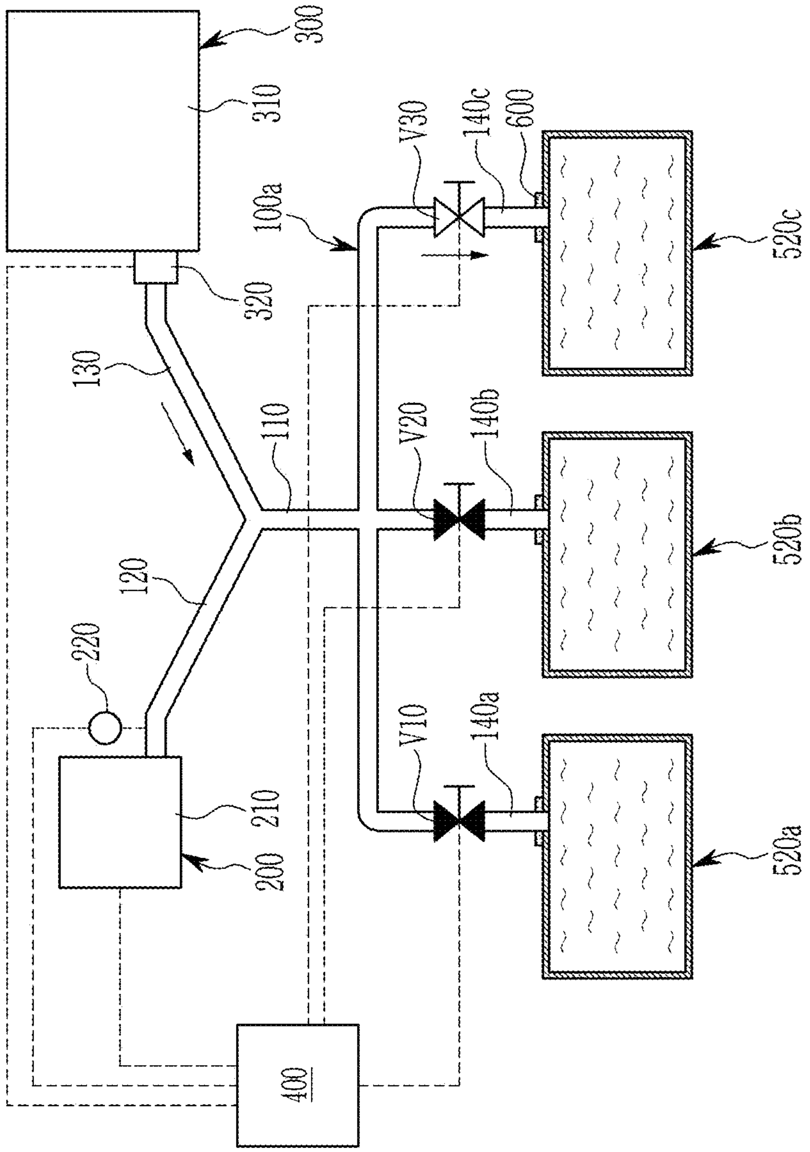

FIGS. 6A-6C are each a configuration diagram for describing an operation of the electrolyte injection device shown in FIG. 5. In FIGS. 6A-6C, for convenience of description, the plurality of branch pipes 140*a*, 140*b*, and 140*c* may be referred to as first to third branch pipes, the plurality of opening and closing valves V10, V20, and V30 may be referred to as first to third opening and closing valves, and the plurality of cases 520*a*, 520*b*, and 520*c* may be referred to as first to third cases.

Referring to FIG. 6A, the control portion 400 may open the first opening and closing valve V10 installed in the first branch pipe 140*a*, and may operate the vacuum pump 210. When the vacuum pump 210 is operated, the air sensor 220 may measure an amount of exhaust air of the first case 520*a*, and the control portion 400 may calculate an injection amount of the electrolyte for the first case 520*a* based on the amount of exhaust air from the first case 520*a* measured by the air sensor 220. A process of calculating the injection amount of the electrolyte is the same as that described in the preceding embodiments, so that a redundant description thereof may not be repeated herein.

Next, the control portion 400 may control or regulate an operation of the injection nozzle 320 so that the injection amount of the electrolyte of the injection nozzle 320 for the first case 520*a* matches the calculated injection amount of the electrolyte. After injection of the electrolyte is completed, the control portion 400 may close the first opening and closing valve V10. In a process of injecting the electrolyte into the first case 520*a*, the second opening and closing valve V20 and the third opening and closing valve V30 may be maintained in a closed state.

Referring to FIG. 6B, the control portion 400 may open the second opening and closing valve V20 installed in the second branch pipe 140*b*, and may operate the vacuum pump 210. When the vacuum pump 210 is operated, the air sensor 220 may measure an amount of exhaust air of the second case 520*b*, and the control portion 400 may calculate an injection amount of the electrolyte for the second case 520*b* based on the amount of exhaust air from the second case 520*b* measured by the air sensor 220.

Next, the control portion 400 may control an operation of the injection nozzle 320 so that the injection amount of the electrolyte of the injection nozzle 320 for the second case 520*b* matches the calculated injection amount of the electrolyte. After injection of the electrolyte is completed, the control portion 400 may close the second opening and closing valve V20. In a process of injecting the electrolyte into the second case 520*b*, the first opening and closing valve V10 and the third opening and closing valve V30 may be maintained in a closed state.

Referring to FIG. 6C, the control portion 400 may open the third switching opening and closing valve V30 installed in the third branch pipe 140*c*, and may operate the vacuum pump 210. When the vacuum pump 210 is operated, the air sensor 220 may measure an amount of exhaust air of the third case 520*c*, and the control portion 400 may calculate an injection amount of the electrolyte for the third case 520*c* based on the amount of exhaust air from the third case 520*c* measured by the air sensor 220.

Next, the control portion 400 may control an operation of the injection nozzle 320 so that the injection amount of the electrolyte of the injection nozzle 320 for the third case 520*c* matches the calculated injection amount of the electrolyte. After injection of the electrolyte is completed, the control portion 400 may close the third opening and closing valve V30. In a process of injecting the electrolyte into the third case 520*c*, the first opening and closing valve V10 and the second opening and closing valve V20 may be maintained in a closed state.

Figure 7:
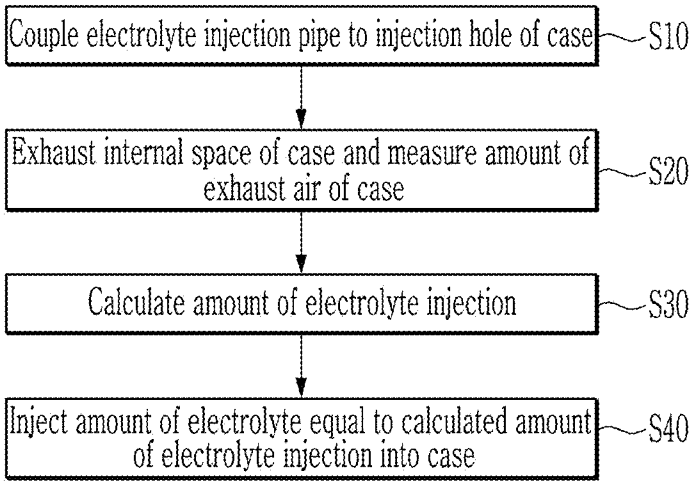
FIG. 7 is a flowchart showing an electrolyte injection method according to one or more embodiments.

FIG. 7 is a flowchart showing an electrolyte injection method according to one or more embodiments.

Referring to FIG. 7, the electrolyte injection method according to the present embodiments may include a process (e.g., a step, act, or task) S10 of coupling the electrolyte injection pipe to an injection hole of the case, a process (e.g., a step, act, or task) S20 of exhausting an internal space of the case by an operation of the vacuum pump and concurrently (e.g., simultaneously) measuring an amount of exhaust air of the case using the air sensor, a process (e.g., a step, act, or task) S30 of calculating an injection amount of the electrolyte corresponding to the amount of exhaust air measured by the air sensor, and a process (e.g., a step, act, or task) S40 of injecting an amount of the electrolyte equal to the calculated amount of the electrolyte injection into the case by opening the injection nozzle installed at an inlet of the electrolyte tank.

Referring to FIGS. 1, 2, and 7, the sealing member 600 such as an O-ring may be used in the process S10 of coupling the electrolyte injection pipe 100 to the injection hole 530 of the case 520. The sealing member 600 may prevent or reduce the leakage of air and/or electrolyte by preventing or reducing a gap between the electrolyte injection pipe 100 and the injection hole 530.

The vacuum pump 210 may exhaust an internal space of the case 520, and at the same time (e.g., concurrently), the air sensor 220 may measure the amount of exhaust air discharged (e.g., expelled) from the case 520 (S20). The vacuum pump 210 may discharge air from inside the case 520 so that the internal space of the case 520 has a pressure of approximately −80 kPa to −95 kPa. The air sensor 220 may include an air flow sensor and/or an air flow meter, and may be automatically operated if (e.g., when) the vacuum pump 210 is operated.

In the process S30 of calculating the amount of the electrolyte injection, the control portion 400 may receive information on the amount of exhaust air measured by the air sensor 220 from the air sensor 220, and may calculate the amount of the electrolyte injection corresponding to the amount of exhaust air. The injection amount of the electrolyte calculated by the control portion 400 may be a maximum injection amount (e.g., a maximum suitable or desirable amount) capable of filling the entire (or substantially entire) internal space of the case 520 without an overflow of the electrolyte.

Before the electrolyte injection device is operated, a maximum possible injection amount (e.g., a maximum suitable or desirable injection amount) of the electrolyte on a mass unit (e.g., in units of mass) corresponding to information on the amount of exhaust air on a volume unit (e.g., in units of volume) may be determined by experimentation. Information on the maximum possible injection amount (e.g., a maximum suitable or desirable injection amount) corresponding to the amount of exhaust air determined by the experimentation may be stored in a memory of the control portion 400.

In the process S30 of calculating the amount of the electrolyte injection, if the control portion 400 receives information on the amount of exhaust air from the air sensor 220, the control portion 400 may upload the information on the maximum possible injection amount (e.g., a maximum suitable or desirable injection amount) of the electrolyte corresponding to the amount of exhaust air into the memory to calculate (or store) the uploaded information as the injection amount of the electrolyte. Because a density of the electrolyte changes according to a composition thereof, the control portion 400 may correct the injection amount of the electrolyte by applying a correction value according to the density to the calculated injection amount of the electrolyte.

In the process S40 of injecting the electrolyte into the case 520, the control portion 400 may control or regulate an opening time and/or an opening degree of the injection nozzle 320 so that the injection amount of the electrolyte of the injection nozzle 320 matches the injection amount of the electrolyte calculated by the control portion 400. When the injection nozzle 320 is opened, the internal space of the case 520 may be in a low-pressure state. Thus, the electrolyte may be relatively quickly filled into the internal space of the case 520.

Referring to FIG. 5 and FIG. 7, according to an electrolyte injection method of one or more other embodiments, the electrolyte may be sequentially injected into the plurality of cases 520*a*, 520*b*, and 520*c*. The electrolyte injection pipe 100*a* may include the plurality of branch pipes 140*a*, 140*b*, and 140*c*, the main pipe portion 110 connected to the plurality of branch pipes 140*a*, 140*b*, and 140*c*, and the first pipe portion 120 and the second pipe portion 130 branched from the main pipe portion 110. The plurality of opening and closing valves V10, V20, and V30 may be respectively installed at the plurality of branch pipes 140*a*, 140*b*, and 140*c*.

In a process S10 of coupling the electrolyte injection pipe 100*a* to injection holes of the cases 520*a*, 520*b*, and 520*c*, the plurality of branch pipes 140*a*, 140*b*, and 140*c* may be respectively coupled to the injection holes of the cases 520*a*, 520*b*, and 520*c*. The sealing member 600 may be coupled to a lower end portion of each of the plurality of branch pipes 140*a*, 140*b*, and 140*c*.

Referring to FIG. 6A and FIG. 7, before the vacuum pump 210 is operated, the control portion 400 may open the first opening and closing valve V10. Next, the vacuum pump 210 may exhaust an internal space of the first case 520*a*, and the air sensor 220 may measure an amount of exhaust air (e.g., expelled air) of the first case 520*a* (S20).

The control portion 400 may calculate an injection amount of the electrolyte for the first case 520*a* corresponding to the amount of exhaust air measured by the air sensor 220 (S30), and may control an operation of the injection nozzle 320 so that an amount of the electrolyte equal to the injection amount of the electrolyte calculated in the process S30 may be injected into the first case 520*a* (S40).

Referring to FIG. 6B and FIG. 7, a process S10 of closing the first opening and closing valve V10 and opening the second opening and closing valve V20 by the control portion 400, a process S20 of performing exhaust by the vacuum pump 210 and measuring an amount of exhaust air of the second case 520*b* by the air sensor 220, a process S30 of calculating an injection amount of the electrolyte for the second case 520*b* by the control portion 400, and a process S40 of injecting the electrolyte into the second case 520*b* by opening the injection nozzle 320 may be continuously (e.g., substantially continuously) performed in substantially the same manner as described in connection with FIG. 6A. Thus, a maximum amount (e.g., a maximum suitable or desirable amount) of the electrolyte may be injected into the second case 520*b*.

Referring to FIG. 6C and FIG. 7, a process S10 of closing the second opening and closing valve V20 and opening the third opening and closing valve V30 by the control portion 400, a process S20 of performing exhaust by the vacuum pump 210 and measuring an amount of exhaust air of the third case 520*c* by the air sensor 220, a process S30 of calculating an injection amount of the electrolyte for the third case 520*c* by the control portion 400, and a process S40 of injecting the electrolyte into the third case 520*c* by opening the injection nozzle 320 may be continuously (e.g., substantially continuously) performed in substantially the same manner as described in connection with FIG. 6A. Thus, a maximum amount (e.g., a maximum suitable or desirable amount) of the electrolyte may be injected into the third case 520*c*.

According to the electrolyte injection device and the electrolyte injection method of the present embodiments, the maximum amount (e.g., a maximum suitable or desirable amount) of the electrolyte may be efficiently or suitably injected into each of the plurality of battery cases having different internal space volumes (e.g., slight variations in internal space volumes) due to the manufacturing process deviation without a lack of (e.g., insufficient amount of) the electrolyte or an overflow of the electrolyte. Thus, performance and lifespan of the rechargeable battery may be improved, and discarding of the battery cases contaminated during the manufacturing process of the rechargeable battery may be minimized or reduced.

While the subject matter of this disclosure has been described in connection with what is presently considered to be practical embodiments, it should be understood that the disclosure is not limited to the disclosed embodiments, but, on the contrary, is intended to cover one or more suitable modifications and equivalent arrangements included within the spirit and scope of the appended claims and their equivalents.

What is claimed is:

1. An electrolyte injection device, comprising:

an electrolyte injection pipe configured to be coupled to an injection hole of a case;

an exhaust module comprising a vacuum pump connected to the electrolyte injection pipe and configured to exhaust an internal space of the case, and an air sensor configured to measure an amount of an exhaust air of the case;

an electrolyte injection module comprising an electrolyte tank connected to the electrolyte injection pipe and configured to store an electrolyte, and an injection nozzle at an inlet of the electrolyte tank; and a control portion electrically connected to each of the air sensor and the injection nozzle.

2. The electrolyte injection device as claimed in claim 1, wherein the electrolyte injection pipe comprises a first pipe portion and a second pipe portion branched to extend in different directions from each other.

3. The electrolyte injection device as claimed in claim 2, wherein the exhaust module is connected to and installed at one of the first pipe portion or the second pipe portion, and the electrolyte injection module is connected to and installed at the other of the first pipe portion or the second pipe portion.

4. The electrolyte injection device as claimed in claim 2, wherein the electrolyte injection pipe further comprises a main pipe portion coupled to the injection hole, and the first pipe portion and the second pipe portion are branched from the main pipe portion.

5. The electrolyte injection device as claimed in claim 1, wherein the control portion controls an injection amount of the electrolyte from the injection nozzle based on an amount of the exhaust air measured by the air sensor.

6. The electrolyte injection device as claimed in claim 5, wherein the control portion calculates an injection amount of the electrolyte corresponding to the amount of the exhaust air measured by the air sensor, and controls an operation of the injection nozzle so that an amount of the electrolyte equal to the calculated injection amount of the electrolyte is injected into the case.

7. An electrolyte injection device, comprising:

an electrolyte injection pipe that comprises a plurality of branch pipes respectively coupled to injection holes of a plurality of cases;

a plurality of opening and closing valves respectively at the plurality of branch pipes;

an exhaust module comprising a vacuum pump connected to the electrolyte injection pipe and configured to exhaust an internal space of each of the plurality of cases, and an air sensor configured to measure an amount of an exhaust air of each of the plurality of cases;

an electrolyte injection module comprising an electrolyte tank connected to the electrolyte injection pipe and configured to store an electrolyte, and an injection nozzle at an inlet of the electrolyte tank; and a control portion electrically connected to each of the plurality of opening and closing valves, the air sensor, and the injection nozzle.

8. The electrolyte injection device as claimed in claim 7, wherein the electrolyte injection pipe comprises a main pipe portion connected to the plurality of branch pipes, and a first pipe portion and a second pipe portion branched from the main pipe portion.

9. The electrolyte injection device as claimed in claim 8, wherein the exhaust module is connected to and installed at one of the first pipe portion or the second pipe portion, and the electrolyte injection module is connected to and installed at the other of the first pipe portion or the second pipe portion.

10. The electrolyte injection device as claimed in claim 7, wherein the control portion sequentially opens the plurality of opening and closing valves so that the electrolyte is sequentially injected into the plurality of cases with a time difference.

11. The electrolyte injection device as claimed in claim 10, wherein the control portion controls an injection amount of the electrolyte from the injection nozzle for each of the plurality of cases based on an amount of the exhaust air measured by the air sensor.

12. The electrolyte injection device as claimed in claim 11, wherein the control portion calculates an injection amount of the electrolyte corresponding to the amount of the exhaust air measured by the air sensor, and controls an operation of the injection nozzle so that an amount of the electrolyte equal to the calculated injection amount of the electrolyte is injected into a case of the plurality of cases.

13. An electrolyte injection method, comprising:

coupling an electrolyte injection pipe to an injection hole of a case;

exhausting an internal space of the case by an operation of a vacuum pump and concurrently measuring an amount of an exhaust air of the case by utilizing an air sensor;

calculating an injection amount of an electrolyte based on the amount of the exhaust air measured by the air sensor; and injecting an amount of the electrolyte equal to the calculated injection amount of the electrolyte into the case by opening an injection nozzle provided at an inlet of an electrolyte tank.

14. The electrolyte injection method as claimed in claim 13, wherein the electrolyte injection pipe is coupled to the injection hole through a sealing member.

15. The electrolyte injection method as claimed in claim 13, wherein the injection amount of the electrolyte is calculated to be a value that is equal to the amount of the exhaust air measured by the air sensor or to a corrected amount of the exhaust air based on a density of the electrolyte.

16. The electrolyte injection method as claimed in claim 13, wherein the electrolyte injection pipe comprises a plurality of branch pipes respectively coupled to injection holes of a plurality of cases, an opening and closing valve is at each of the plurality of branch pipes, and a plurality of opening and closing valves are sequentially opened so that the electrolyte is sequentially injected into the plurality of cases with a time difference.

17. The electrolyte injection method as claimed in claim 16, wherein the injection amount of the electrolyte for each of the plurality of cases is calculated to be a value that is equal to the amount of the exhaust air measured by the air sensor or to a corrected amount of the exhaust air based on a density of the electrolyte.

* * * * *